United States Patent
Hamada et al.

(10) Patent No.: US 6,489,988 B1
(45) Date of Patent: Dec. 3, 2002

(54) METHOD AND APPARATUS FOR DETECTING SYNCHRONIZATION SHIFT BETWEEN ORIGINAL IMAGE AND REPRODUCED IMAGE OF VIDEO SIGNAL

(75) Inventors: Takahiro Hamada, Saitama (JP); Satoshi Miyaji, Tokyo (JP); Shuichi Matsumoto, Tokyo (JP)

(73) Assignee: Kokusai Denshin Denwa Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/012,858

(22) Filed: Jan. 23, 1998

(30) Foreign Application Priority Data

Feb. 4, 1997 (JP) .............................................. 9-034254

(51) Int. Cl.[7] .............................................. H04N 17/02
(52) U.S. Cl. ........................ 348/180; 348/181; 348/185; 348/395
(58) Field of Search ................................ 348/180, 181, 348/184, 185, 186, 192, 193, 194, 518, 519, 515, 513, 516, 549; 324/76.52, 76.54, 76.55, 76.61, 76.77, 76.82; 345/213, 121

(56) References Cited

U.S. PATENT DOCUMENTS

| | | | | |
|---|---|---|---|---|
| 3,182,128 A | * | 5/1965 | Legler | 348/516 |
| 3,609,223 A | * | 9/1971 | Tajiri et al. | 348/549 |
| 4,180,829 A | * | 12/1979 | Pires | 348/192 |
| 5,574,500 A | * | 11/1996 | Hamada et al. | 348/180 |
| 5,694,174 A | * | 12/1997 | Suzuki | 348/518 |
| 5,818,520 A | * | 10/1998 | Janko et al. | 348/192 |
| 5,894,324 A | * | 4/1999 | Overton | 348/181 |

* cited by examiner

Primary Examiner—John Miller
Assistant Examiner—Trang U. Tran
(74) Attorney, Agent, or Firm—Westman, Champlin & Kelly, P.A.

(57) ABSTRACT

This invention aims to provide a method and apparatus for detecting a synchronization shift in which the synchronization shift between an original image and a reproduced image can be accurately detected even if noises are generated by a video codec or the like. An original image sent out from an image source 1 has a sine wave for synchronization overwritten thereon in a frame memory. The image on which the sine wave has been overwritten is decoded in a codec and stored in another frame memory. The two images srored. in two frame memories are simultaneously started to be read out. From the image from the other frame memory, only the sine wave is extracted in a notch filter, subjected to an offset correction in an adder, and inputted to asynchronization shift detecting unit. The synchronization shift detecting unit uses the sine wave to detect line, frame and horizontal pixel shifts. Since a sine wave is used as a synchronization marker and only the sine wave is extracted in the notch filter, the synchronization shift can be accurately detected.

3 Claims, 7 Drawing Sheets

| m |  |  |  |  |  |  |  |  |  |  |  |  |
|---|---|---|---|---|---|---|---|---|---|---|---|---|
| 1 | 0 | 0 | 0 | 0 | 0 | 0 | 1 | 1 | 1 | 1 | 1 | 1 |
| 2 | 0 | 0 | 0 | 0 | 0 | 1 | 1 | 1 | 1 | 1 | 1 | 0 |
| 3 | 0 | 0 | 0 | 0 | 1 | 1 | 1 | 1 | 1 | 1 | 0 | 0 |
| 4 | 0 | 0 | 0 | 1 | 1 | 1 | 1 | 1 | 1 | 0 | 0 | 0 |
| 5 | 0 | 0 | 1 | 1 | 1 | 1 | 1 | 1 | 0 | 0 | 0 | 0 |
| 6 | 0 | 1 | 1 | 1 | 1 | 1 | 1 | 0 | 0 | 0 | 0 | 0 |
| LINE SHIFT | IMPOSSIBLE | −5 | −4 | −3 | −2 | −1 | 0 | +1 | +2 | +3 | +4 | +5 |

LINE SHIFT PATTERN (L=6)

(CALCULATION OF INNER PRODUCT BETWEEN ORIGINAL AND REPRODUCES IMAGES)

(HORIZONTAL INTERPOLATION)

METHOD AND APPARATUS FOR DETECTING SYNCHRONIZATION SHIFT BETWEEN ORIGINAL IMAGE AND REPRODUCED IMAGE OF VIDEO SIGNAL

BACKGROUND OF THE INVENTION

1. Field of the invention

The present invention is related to a method and apparatus for the synchronization shift between an original image and a reproduced image of video signal, and particularly to a method and apparatus for accurately detecting the synchronization shift between an original image and a reproduced image of video signal outputted from a video codec or the like in a system for evaluating the video codec.

2. Description of the Related Art

As an example of the conventional method and apparatus for synchronizing an original image with a reproduced image of video signal, there is a method invented by the present inventors and described in Published Unexamined Patent Application No. 8-205156 (U.S. Pat. No. 5,574,500), etc. This method is outlined with reference to FIG. 10.

When an original image is inputted from an image source 51 to a first input unit 52, the first input unit 52 performs an A/D conversion of this image, and then outputs it to a synchronization marker adding unit 53. The synchronization marker adding unit 53 adds a synchronization maker, for instance, of a rectangular wave to incoming digital data. The digital data to which the synchronization marker has been added is sent to a system to be evaluated 57 via an output unit 56.

The system to be evaluated 57 is a digital television codec which is a subject to be tested, and the system to be evaluated 57 codes incoming digital data, and thereafter decodes and outputs it to a second input unit 58. The second input unit 58 digitizes the decoded data and outputs it. The reproduced image data outputted from the second input unit 58 is inputted to a synchronization control unit 54. The synchronization control unit 54 controls the delay by a delay unit 55 so that the marker of the original data delayed at the delay unit 55 matches that of the reproduced image data. The delay is, for instance, one frame or several frames. Consequently, the original image data can be synchronized with the reproduced image data.

However, in the above described prior art, a rectangular wave was used as a waveform for the synchronization marker. A rectangular wave contains many frequencies, and if noises of various frequencies are superposed on the rectangular wave by video codec or the like, the waveform of the rectangular wave collapses. It is substantially impossible to remove the noises to restore the waveform: of the marker to the rectangular wave. Accordingly, the synchronization must be performed by detecting the synchronization shift by the collapsed marker waveform, and a synchronization shift cannot be accurately detected, which leads to a problem that an accurate synchronization is not provided.

SUMMARY OF THE INVENTION

It is the object of the present invention to remove the above described prior art problem and provide a method and apparatus for the detecting a synchronization shift, in which the synchronization shift between an original image and a reproduced image of video signal can be accurately detected even if a noise is generated by a video codec or the like.

To accomplish the above object, the present invention is a method for detecting the synchronization shift between an original image and a reproduced image of video signal, characterized in that a signal of a substantially single frequency is used as the synchronization marker for the original image and the processed image, and the signal is overwritten on-a plurality of predetermined lines of the original image.

Further, the present invention is characterized by subjecting the reproduced image to a narrow-band band-pass filtering to extract the signal-frequency signal, and calculating the inner product of a signal obtained by subjecting the signal-frequency signal to an offset processing and the signal-frequency signal overwritten on the original image between the lines of the reproduced image and the original image which are corresponding to each other, thereby to detect at least one of the line shift and the frame shift; and subjecting the reproduced image to a narrow-band band-pass filtering to extract the signal-frequency signal, and calculating the inner product of a signal obtained by subjecting the signal-frequency signal to an offset processing and each inter-pixel interpolation of the signal-frequency signal overwritten on the original image between the lines of the reproduced image and the original image which are corresponding to each other, thereby to detect the horizontal pixel shift.

Furthermore, the present invention is an apparatus for detecting the synchronization shift between an original image and a reproduced image, characterized by comprising an overwriting means for overwriting a sine wave or a cosine wave on a plurality of predetermined lines of the original image, a narrow-band band-pass filter means for extracting only the sine wave or cosine wave with respect to the reproduced image on which the sine wave or cosine wave has been overwritten, an offset correction means for performing a direct-current offset correction on the sine or cosine wave having passed through the band-pass filter means, and a detecting means for detecting at least one of the line shift, frame shift and horizontal pixel shift by using the original image and the sine or cosine wave of the reproduced image on which the offset correction has been made.

In accordance with the present invention, since a signal of a substantially signal frequency is used as the synchronization marker for the original image and the reproduced image, noises of the various frequencies generated by the processing by a video codec or the like and superposed on the synchronization marker can be completely removed. Accordingly, the line shift, frame shift and horizontal pixel shift between the original image and the reproduced image can be accurately detected.

DETAIL DESCRIPTION OF THE PREFERRED EMBODIMENT

Figure 1:
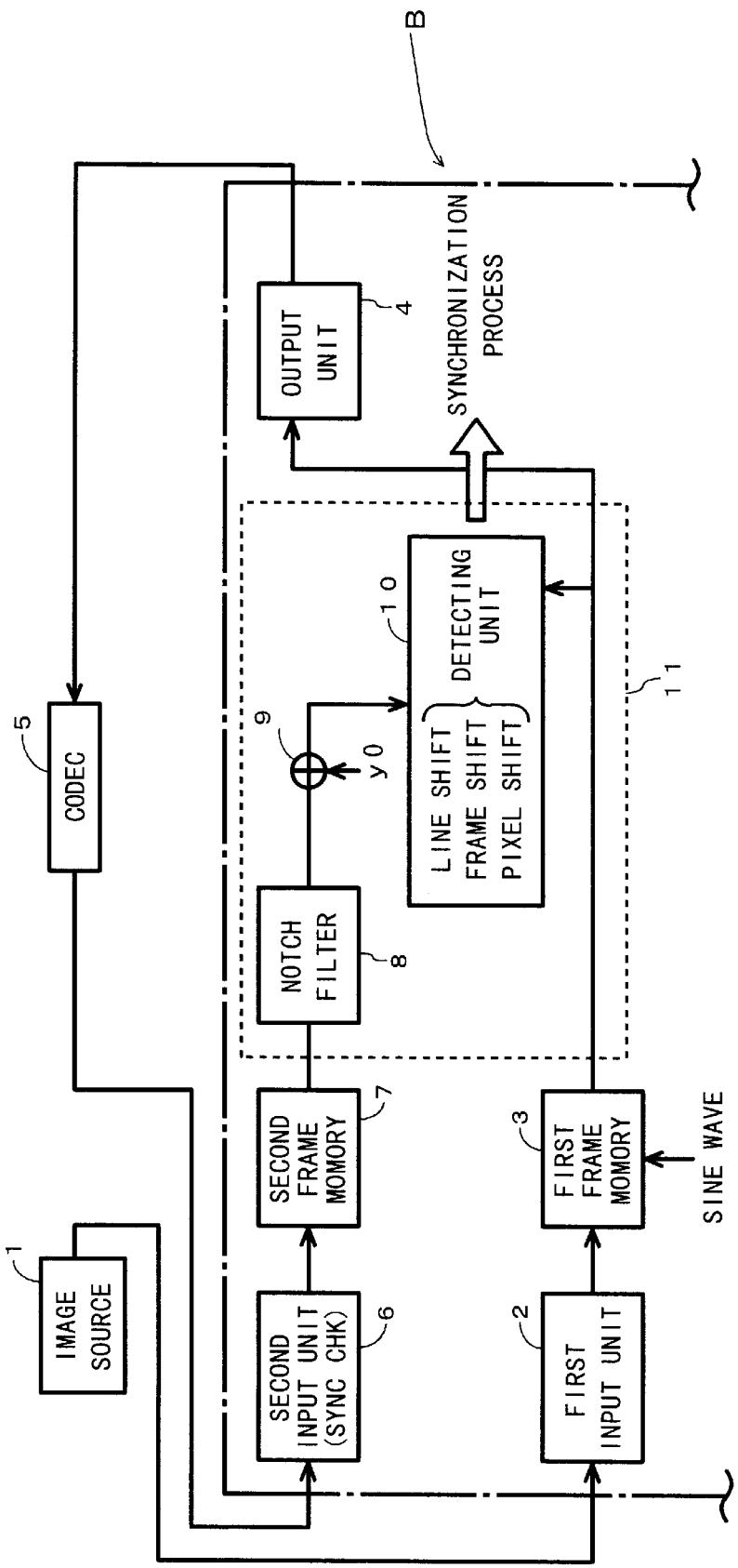
FIG. 1 is a block diagram showing the construction of part of a video codec evaluation system incorporating the present invention.

Now, the present invention is described in detail with reference of the drawings. FIG. 1 is a block diagram showing the construction for implementing an embodiment of the present invention. If an image source 1 is a composite television signal, a signal of one system is inputted to a first input unit 2, and if it is a component television signal, signals of three systems are inputted to the first input unit 2. The first input unit 2 performs an AID conversion of the signal from the image source 1 if it is an analog signal, and then sends it out to a first frame memory 3, while the first input unit 2 directly sends it out to the frame memory 3 if it is a digital signal. The digital signal outputted from the first input unit 2 is temporarily stored in the first frame memory 3. In the first frame memory 3, a trigonometric functions wave (a sine wave or cosine wave) acting as a marker is overwritten on predetermined L lines of the upper portion of a frame which is stored data, as described later in detail.

The data stored in the first frame memory 3 is later sent through an output unit 4 to a codec 5 which is a subject to be tested. In codec 5, the frame data from the output unit 4 is decoded and reproduced, and outputted to a second input unit 6. The second input unit 6 performs a synchronization check and an A/D conversion on the reproduced frame data, and sends it out to a second frame memory 7. As a result of the synchronization check by the second input unit 6, the frame data stored in the first and second frame memories 3 and 7 have only a frame shift in the time direction in principle.

The data stored in the first and second frame memories 3 and 7 are read out in synchronism with each other. The data read out from the second frame memory 7 is provided to a notch filter 8, and subjected to an offset correction in an adder 9. The notch filter 8 is a pass-type band-pass filter of a very narrow band, and it is made so as to allow the passage only of the sine wave buried by the first frame memory 3. Thus, noises of various frequencies generated by a codec 5 or the like and superposed on the sine wave are removed, and a clean sine wave having no noise is restored. Further, since the direct-current component y0 superposed on the sine wave is also removed in the notch filter 8, the offset correction in the adder 9 is required.

The frame data subjected to the offset correction in the adder 9 is inputted to a synchronization shift detecting unit 10. The notch filter 8, the adder 9 and the synchronization shift detecting unit 10 form a synchronization shift detecting and processing unit 11 which is the main portion of the present invention. Further, if an accurate line shift, frame shift and pixel shift are detected in the synchronization shift detecting unit 10, a synchronization process is performed in a matching unit, not shown. in addition, B represents a video codec evaluation system to which the present invention is applied, and only part of the video codec evaluation system is shown in the figure. A detailed description of the video codec evaluation system is made in the above U.S. Pat. No. 5,574,500.

Figure 2:
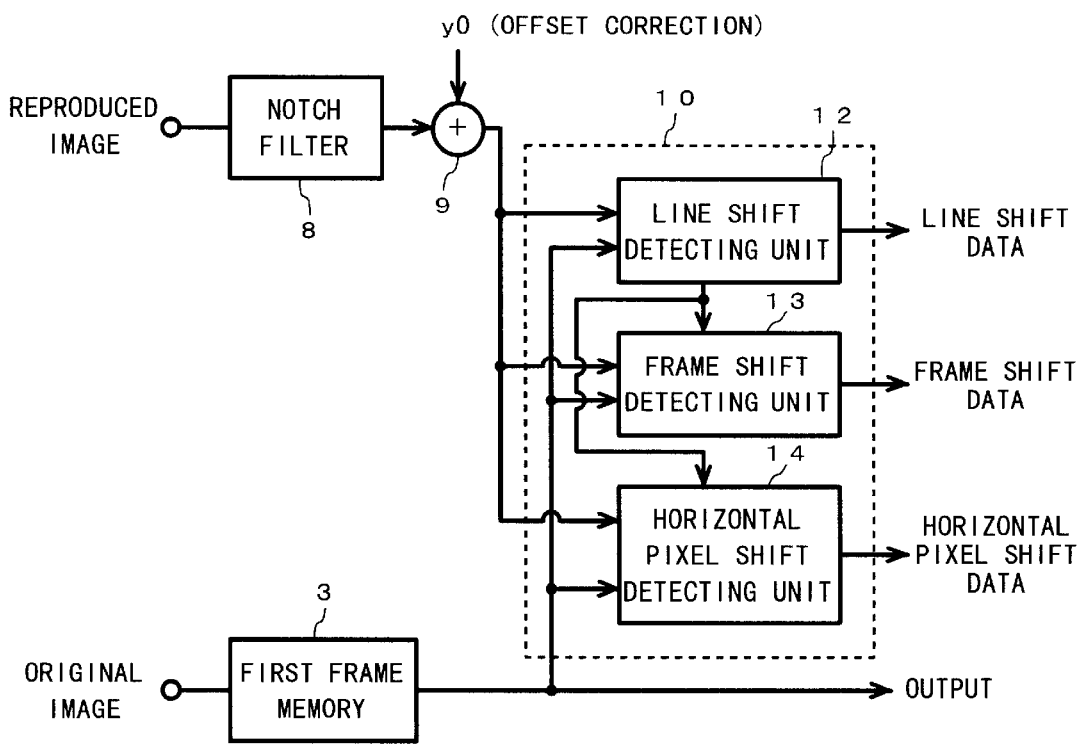
FIG. 2 is a block diagram showing the schematic construction of an embodiment of the present invention.

FIG. 2 is a block diagram showing the construction of the synchronization shift detecting and processing unit 11 of an embodiment of the present invention. In the figure, the same symbols as FIG. 1 represent the same or identical portions. As shown, the synchronization shift detecting unit 10 is made up of a line shift detecting unit 12, a frame shift detecting unit 13, and a horizontal pixel shift detecting unit 14 to which the original image data read out from the first frame memory 3 and the reproduced image data subjected to an offset correction after passing through the notch filter 8 are inputted. In addition, since the data stored in the first and second frame memories 3 and 7 are read out in synchronism with each other as described above, the horizontal synchronizations of both frames in the original image data and the reproduced image data completely match each other.

Figure 3:
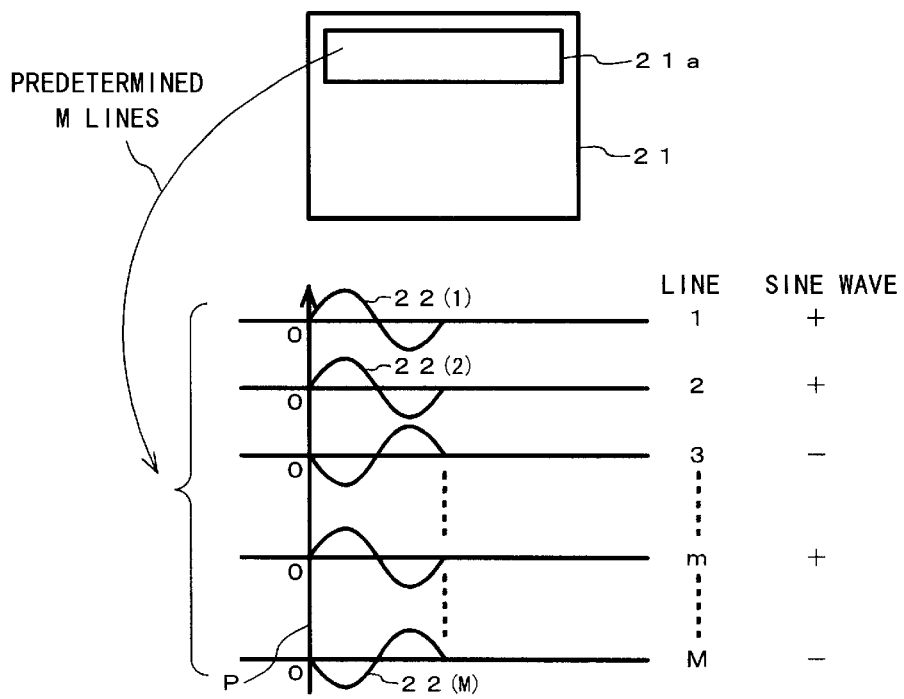
FIG. 3 is an explanatory view of the sine wave to be overwritten on a frame.

The overwriting of the sine wave in the first frame memory 3 is described below with reference to FIG. 3. If a frame 21 in FIG. 3 is frame data stored in the first frame memory 3, sine waves 22(1), 22(2), . . . , and 22(M) are buried in the respective ones of a predetermined M lines 21a in the top portion of the frame 21. Each of the sine waves 22(1), 22(2), . . . , and 22(M) has a phase based on a reference pixel position p, and the phase is shifted by 0 degree or 180 degrees between each line.

Figure 4:
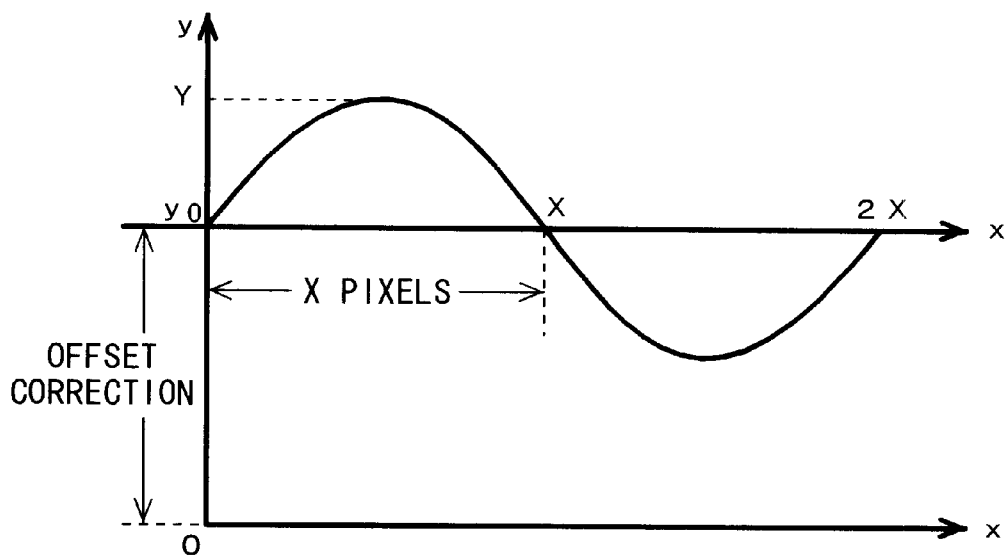
FIG. 4 is a waveform diagram showing the detail of the sine wave.

FIG. 4 is a figure showing the above sine waves, and sine wave 22(1) is typically shown. This sine wave can be expressed by the following equation.

$$y = \pm Y \sin(x/X \cdot \pi) + y0$$

where X represents the number of pixels in the half-wavelength of the sine wave. From this equation, it is obvious that the direct-current component y0 is biased.

Figure 5:
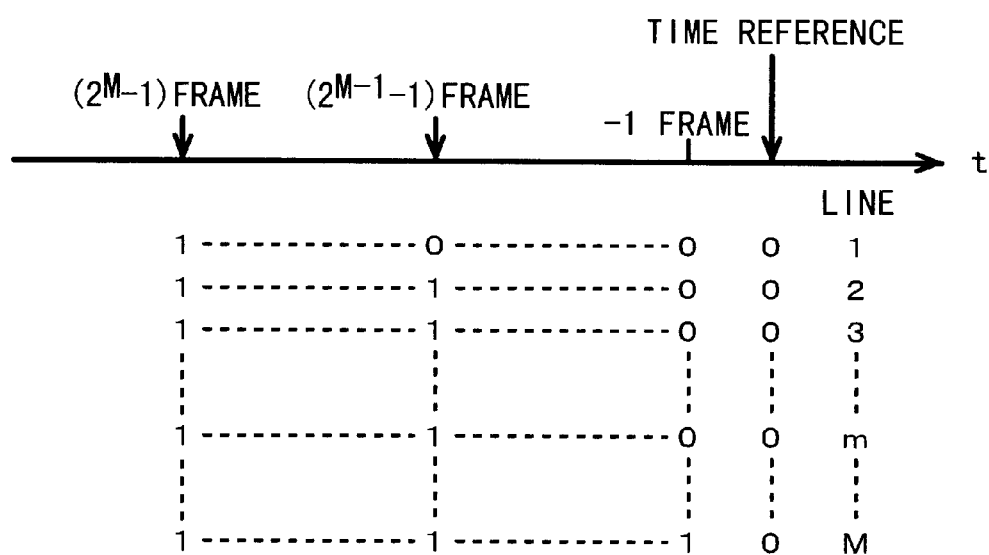
FIG. 5 is an explanatory view of the overwrite pattern of the sine wave for each frame.

Then, as shown in FIG. 5, the sine waves are overwritten with a different combination for each one frame of a video picture. Now, if it is assumed that a sine wave having a phase of 0 degree based on the reference pixel position p is represented by "0", a sine wave having a phase of 180 degrees is represented by "1" and the sine waves are overwritten for M lines for one frame of the video picture, then the combination of the sine waves "0" and "1" circulates with $2^M$ pictures. That is, as shown, if patterns of the sine wave of the frame of a certain time reference are all sine waves of "0" for 1 to M lines, then, at the −1 frame, one frame before, the sine wave of "0" is overwritten for lines 1 to (M-1) and the sine wave of "1" is overwritten for line M. Similarly, in the $(2^{M-1}-1)$-th frame and $(2^M-1)$-th frame, the sine waves of the shown combination are overwritten.

Now, the operation of the line shift detecting unit 12 is described. The line shift detecting unit 12 calculates an inner product between the sine wave ym(x)-y0 overwritten of the original image which is read out from the first frame memory 3 and inputted to the line shift detecting unit 12, and the sine wave y'm(x)-y0 overwritten on the reproduced image which is inputted to the line shift detecting unit 12 via the notch filter 8 and the adder 9. Here, m represents the lines (scan lines) of the original image and reproduced image. This inner product can be expressed by the following equation.

$$I(m) = \sum_{x=0}^{2X-1} \{ym(x) - y0\}\{y'm(x) - y0\}$$

The absolute value | I(m) | of the inner product I(m) obtained by the above equation is compared with a predetermined threshold value Th1 as to which is greater. And, if | I(m) | ≧Th1, I(m)=1, and if | I(m) | <T h1, I(m)=0. By calculating the inner product I(m) for the M lines and comparing the result with the line shift detection table of FIG. 6, the line shift can be detected.

Figures 6, 7:
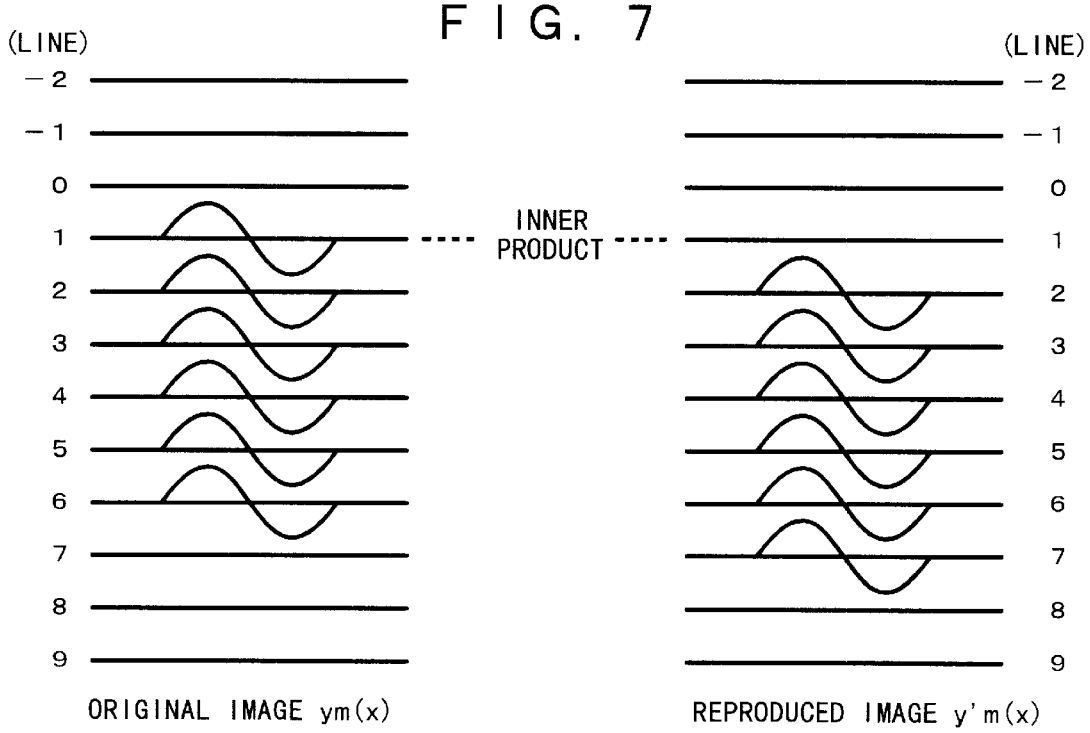
FIG. 6 is diagram showing a line shift pattern used for determining the line shift.
FIG. 7 is an explanatory view of the inner product for determining or the line shift and the frame shift.

For instance, if there is a shift of one line between the sine wave ym(x) of the original image and the sine wave y'm(x) of the reproduced image, as shown in FIG. 7, the absolute value | I(1) | of the inner product l(1) for the first line is 0. On the other hand, the absolute value | I(m) | of the inner product I(m) for the second to M-th lines is 1. Then, if this result is compared with the line shift detection table of FIG. 6, it can be detected that there is a line shift of −1 line. FIGS. 6 and 7 show an example assuming M=6.

The operation of the frame shift detecting unit 13 is described below. For the frame shift detection, the above inner product I(m) is used, and the inner product I(m) is compared with predetermined threshold values +Th and −Th. And, if I(m)≧+Th, it is defined that i(m)=0, and if I(m)≦−Th, it is defined that i(m)=1. Then, the frame shift is obtained from the following equation, in which it is assumed that m=1 to 6.

Figure 8:
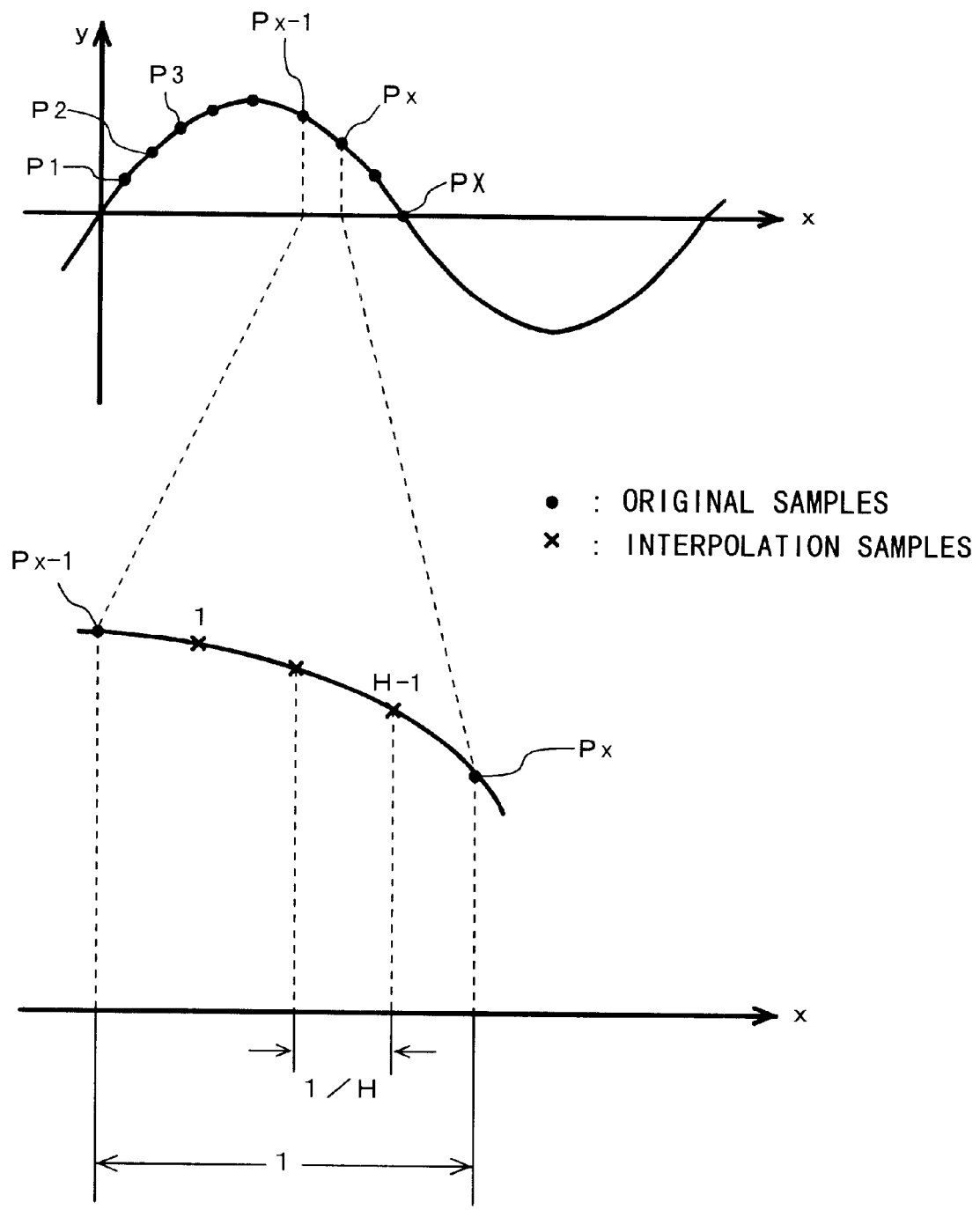
FIG. 8 is an explanatory view of the interpolation process for determining the horizontal pixel shift.

Frame shift $=2^6-\{i(6)+i(5)\cdot 2+i(4)2^2+i(3)\cdot 2^3+i(2)\cdot 2^4+i(1)\cdot 2^5\}$ The operation of the horizontal pixel shift detecting unit 14 is now described. If the sine waves overwritten on the original image and reproduced image take a waveform as shown in FIG. 8, the waveform is specially made up of pixels p1, p2, p3, ..., px-1, px, ... Then, for the sine waves overwritten on the original image and reproduced image, each pixel interval p1-p2, p2-p3, ..., px-1-px, ... of the pixels p1, p2, p3, ..., px-1, px, ... is divided into H (H: a positive integer) to obtain H-1 interpolation samples 1 to (H-1).

Subsequently, for the sine waves of the original image and reproduced image, the inner products J(n) of the interpolation samples 1 to (H-1) are calculated by the following equation.

$$J(n) = \sum_{m=1}^{6} \sum_{x=0}^{2x-1} \sum_{p=0}^{H-1} |ym(x+p/H) \cdot y'm(x+p/H+n/H)|$$

And, n giving the maximum J(n) is searched within the range of the absolute value | n | ≧NH of n. This n indicates the horizontal pixel shift of the reproduced image.

Thus, the line shift, frame shift and horizontal pixel shift between the original image and the reproduced image of the original image once coded by the codec 5 can be accurately detected. The detection result of the line shift, frame shift and horizontal pixel shift is sent to a matching unit, not shown, and used for a matching process.

As obvious from the above description, in accordance with the present invention, since a signal of a substantially signal frequency is used as the synchronization marker for the original image and the reproduced image, the noise superposed on the synchronization marker for the reproduced image can be removed almost completely by a filtering process. Thus, the line shift, frame shift and horizontal pixel shift between the original image and the reproduced image can be accurately detected.

Figure 9:
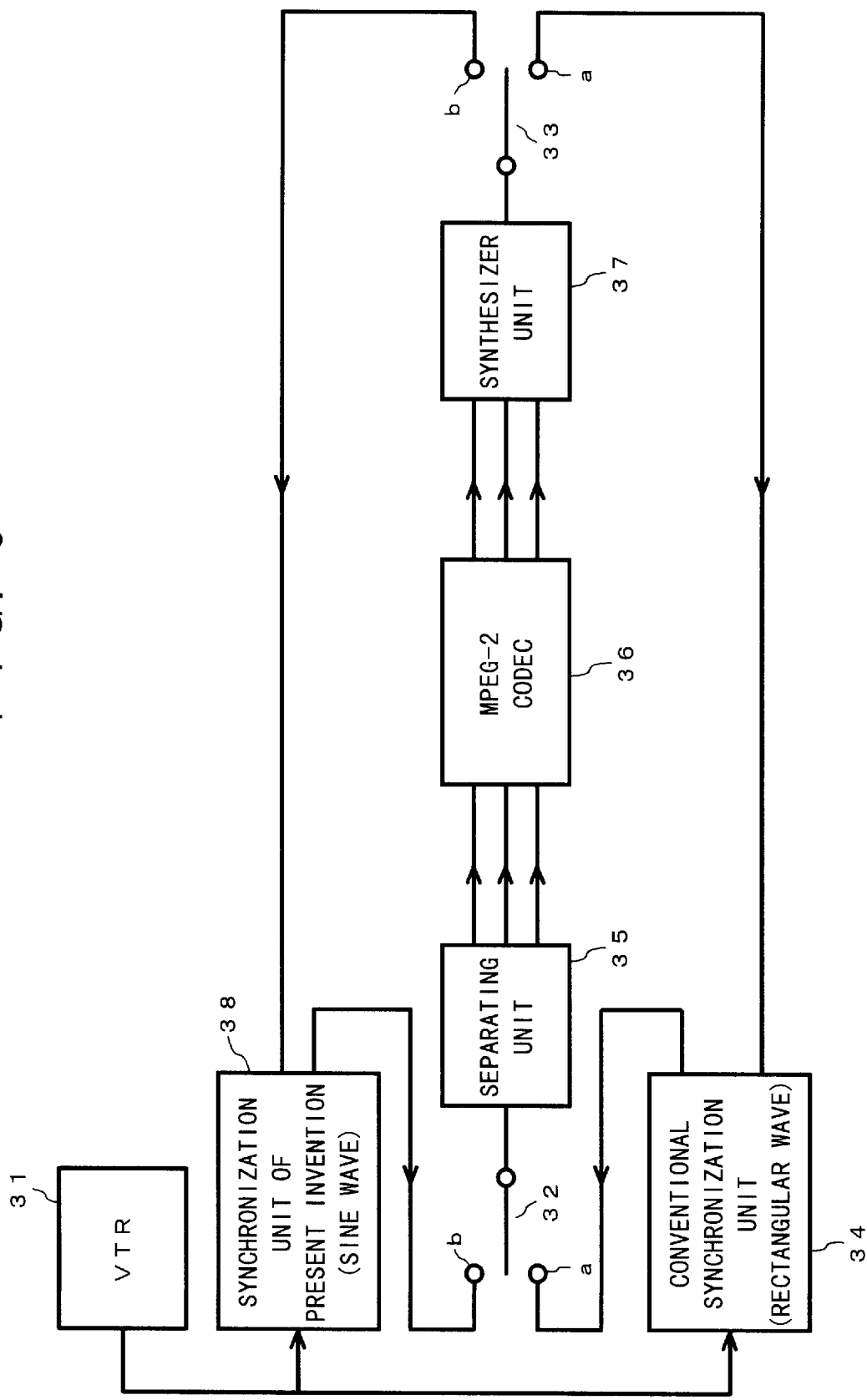
FIG. 9 is a block diagram showing the construction of the synchronizing unit for checking the effect of the present invention.
Figure 10:
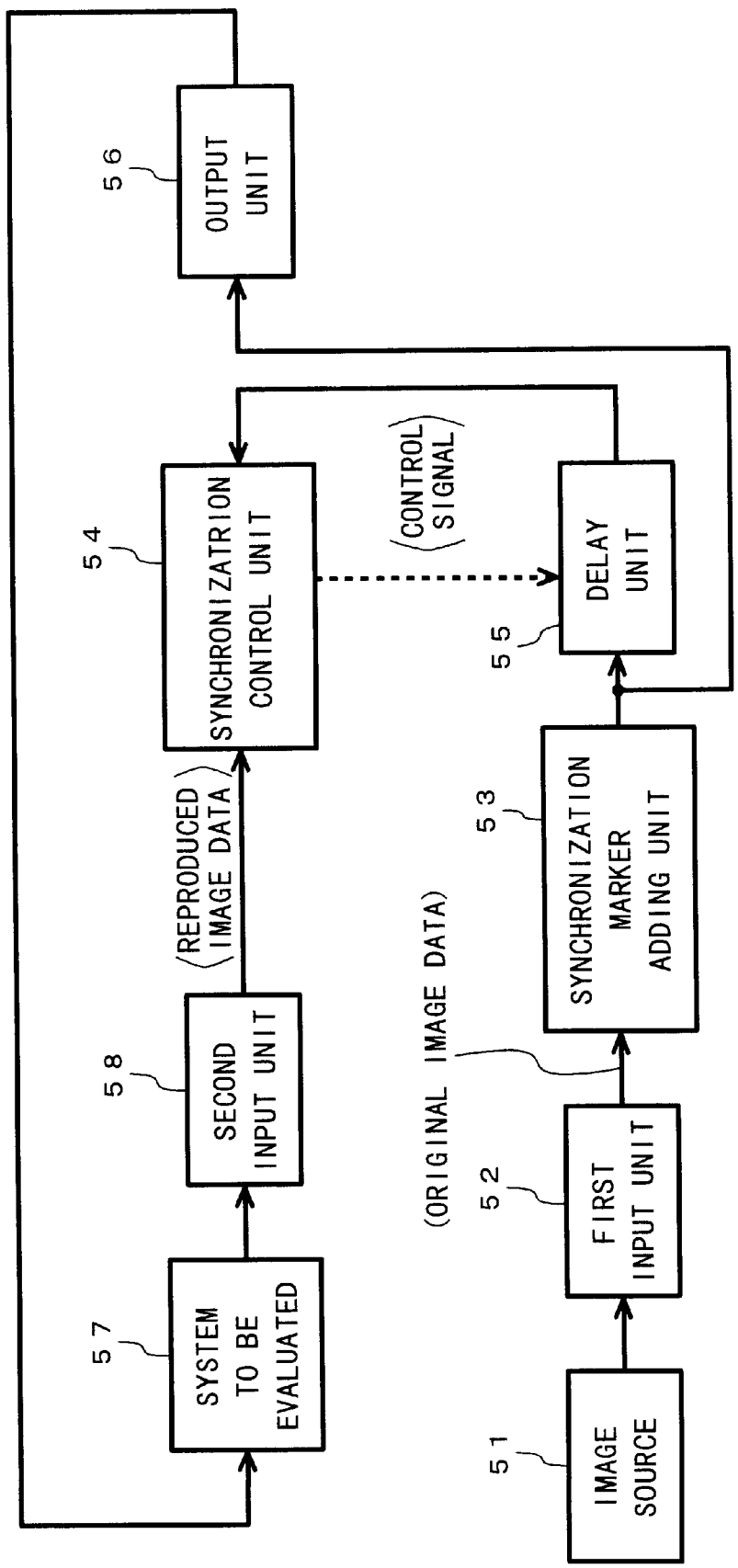
FIG. 10 is a block diagram showing the construction of the conventional synchronizing unit.

To ascertain the effect of the present invention, the present inventor used the apparatus of FIG. 9 to carry out the synchronization using the conventional synchronization shift detection, and the synchronization using the synchronization shift detection of the present invention. In this experiment, first, switches 32 and 33 were caused to fall to the terminal a side, and a test image was sent out from a VTR 31. This test image is temporarily stored in a synchronization unit 34, and thereafter inputted through the switch 32 to a separating unit 35 where the component television signal is separated into the signals of three systems. In a MPEG-2 codec 36, these three-system signals are decoded. The decoded three-system signals are synthesized in a synthesizer unit 37, and enters the synchronization unit 34 via the switch 33. And, in the synchronization unit 34, synchronization was performed between the test original image from the VTR 31 and the reproduced image of the MPEG-2 codec 36. Then, the switches 32 and 33 were caused. to fall to the terminal b side, and in the synchronization unit 38 of the present invention, synchronization was performed between the test original image from the VTR 31 and the reproduced image from the MPEG-2 codec 36 in a way similar to the above.

As a result, in the conventional synchronization method, each measurement provided a different SNR and its value was small, so it cannot be said that an accurate synchronization was performed. On the other hand, in the synchronization using the synchronization shift detecting method of the present invention, the synchronization could always be stably achieved, and the SNR of the processed image for the original image always had reproducibility.

What is claimed is:

1. A method for detecting the synchronization shift between an original image and a reproduced image, the method comprising steps of:

generating a signal of a substantially single frequency;

overwriting the signal of a single frequency on a plurality of predetermined lines of the original image, the signal serving as a synchronization marker for the original image and the reproduced image;

filtering the reproduced image with a narrow-band band-pass filter to extract the signal of a single frequency; and calculating the inner product of a signal obtained by subjecting the signal of a single frequency to an offset processing and the signal of a single frequency overwritten on the original image between the lines of the reproduced image and the original image that correspond to each other, thereby detecting at least one of a line shift and a frame shift.

2. A method for detecting the synchronization shift between an original image and a reproduced image, the method comprising steps of:

generating a signal of a substantially single frequency;

overwriting the signal of a single frequency on a plurality of predetermined lines of the original image, the signal serving as a synchronization marker for the original image and the reproduced image;

filtering said reproduced image with a narrow-band band-pass filter to extract the signal of a single frequency; and calculating the inner product of a signal obtained by subjecting the signal of a single frequency to an offset processing and each pixel interpolation signal of the signal of a single frequency overwritten on the original image between the lines of the reproduced image and the original image that correspond to each other, thereby detecting a horizontal pixel shift.

3. An apparatus for detecting the synchronization shift between an original image and a reproduced image, comprising:

a means for overwriting a trigonometric functions wave on a plurality of predetermined lines of said original image;

a narrow-band band-pass filter means for extracting only said trigonometric functions wave for processed image obtained by processing the original image on which said trigonometric functions wave is written;

an offset correction means for performing an offset correction of the direct-current-component on the trigonometric functions wave having passed through said band-pass filter means; and a shift detecting means for detecting at least one of a line shift, frame shift and horizontal pixel shift by using said trigonometric functions wave of said original image and said reproduced image which has been subjected to the offset correction.

* * * * *